(12) United States Patent
Siddiqi et al.

(10) Patent No.: US 11,307,868 B2
(45) Date of Patent: *Apr. 19, 2022

(54) TECHNIQUES FOR SWITCHING BETWEEN OPERATING SYSTEMS

(71) Applicant: INTEL CORPORATION, Santa Clara, CA (US)

(72) Inventors: Faraz A. Siddiqi, Portland, OR (US); Barnes Cooper, Tigard, OR (US)

(73) Assignee: INTEL CORPORATION, Santa Clara, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/639,605

(22) Filed: Jun. 30, 2017

(65) Prior Publication Data

US 2017/0300342 A1 Oct. 19, 2017

Related U.S. Application Data

(63) Continuation of application No. 14/220,812, filed on Mar. 20, 2014, now Pat. No. 9,934,047.

(51) Int. Cl.
| | |
|---|---|
| *G06F 9/44* | (2018.01) |
| *G06F 13/00* | (2006.01) |
| *G06F 9/455* | (2018.01) |
| *G06F 9/46* | (2006.01) |
| *G06F 9/4401* | (2018.01) |

(52) U.S. Cl.
CPC ........ *G06F 9/4406* (2013.01); *G06F 9/45558* (2013.01); *G06F 13/00* (2013.01); *G06F 9/4418* (2013.01); *G06F 9/46* (2013.01); *G06F 2009/45575* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,254,744 | B2 * | 8/2007 | Dunstan | .................... G06F 1/30 714/24 |
| 7,523,323 | B2 * | 4/2009 | Rothman | .............. G06F 9/4418 711/156 |
| 8,327,174 | B2 * | 12/2012 | Banga | ..................... G06F 9/441 713/323 |

(Continued)

FOREIGN PATENT DOCUMENTS

| | | |
|---|---|---|
| CN | 1700175 A | 11/2005 |
| CN | 101782861 A | 7/2010 |

(Continued)

*Primary Examiner* — Umut Onat
*Assistant Examiner* — Phuong N Hoang
(74) *Attorney, Agent, or Firm* — Kacvinsky Daisak Bluni PLLC

(57) ABSTRACT

Various embodiments are generally directed to an apparatus, method and other techniques for receiving information to invoke a transition from a first operating system to a second operating system, copying a system context for the second operating system from a location of a non-volatile memory to a volatile memory, the location associated with the second operating system and transitioning from the first operating system to the second operating system using the system context for the second operating system.

21 Claims, 10 Drawing Sheets

(56) References Cited

U.S. PATENT DOCUMENTS

| | | | | |
|---|---|---|---|---|
| 8,826,276 B1* | 9/2014 | Li | | G06F 9/4843 |
| | | | | 718/1 |
| 2007/0005947 A1* | 1/2007 | Chartrand | | G06F 9/4418 |
| | | | | 713/1 |
| 2007/0214367 A1* | 9/2007 | Watanabe | | H04N 7/1675 |
| | | | | 713/189 |
| 2008/0177905 A1* | 7/2008 | Ohta | | G06F 9/45533 |
| | | | | 710/14 |
| 2010/0122077 A1* | 5/2010 | Durham | | G06F 1/3203 |
| | | | | 713/100 |
| 2010/0192152 A1* | 7/2010 | Miyamoto | | G06F 9/45558 |
| | | | | 718/102 |
| 2010/0333100 A1* | 12/2010 | Miyazaki | | G06F 9/4881 |
| | | | | 718/103 |
| 2012/0054744 A1* | 3/2012 | Singh | | G06F 9/45558 |
| | | | | 718/1 |
| 2012/0110496 A1* | 5/2012 | Lee | | G06F 3/0488 |
| | | | | 715/778 |
| 2012/0191961 A1* | 7/2012 | Wu | | G06F 1/3275 |
| | | | | 713/2 |
| 2012/0226925 A1* | 9/2012 | Wang | | G06F 9/485 |
| | | | | 713/321 |
| 2013/0174151 A1* | 7/2013 | Nakajima | | G06F 9/4418 |
| | | | | 718/1 |
| 2014/0013324 A1* | 1/2014 | Zhang | | H04L 49/70 |
| | | | | 718/1 |
| 2014/0068317 A1* | 3/2014 | Kanigicherla | | G06F 9/5011 |
| | | | | 714/2 |
| 2014/0245294 A1* | 8/2014 | Kaul | | G06F 9/45558 |
| | | | | 718/1 |
| 2014/0325197 A1* | 10/2014 | Lewis | | G06F 9/4418 |
| | | | | 713/2 |
| 2014/0359778 A1* | 12/2014 | Kruglick | | G06F 9/45533 |
| | | | | 726/25 |

FOREIGN PATENT DOCUMENTS

| | | |
|---|---|---|
| CN | 102369510 A | 3/2012 |
| CN | 103309737 A | 9/2013 |
| JP | 2013541877 A | 11/2013 |
| JP | 2013546087 A | 12/2013 |
| WO | 2013035141 A1 | 3/2013 |
| WO | 2013062564 A1 | 5/2013 |

* cited by examiner

*800*

```
┌─────────────────────────────────────────────┐
│ RECEIVE INFORMATION TO INVOKE A TRANSITION FROM A │
│   FIRST OPERATING SYSTEM TO A SECOND OPERATING    │
│                    SYSTEM                         │
│                     802                           │
└─────────────────────────────────────────────┘
                       │
┌─────────────────────────────────────────────┐
│  COPY A SYSTEM CONTEXT FOR THE SECOND OPERATING   │
│  SYSTEM FROM A SECOND LOCATION OF A NON-VOLATILE  │
│ MEMORY TO A VOLATILE MEMORY, THE SECOND LOCATION  │
│   ASSOCIATED WITH THE SECOND OPERATING SYSTEM     │
│                     804                           │
└─────────────────────────────────────────────┘
                       │
┌─────────────────────────────────────────────┐
│  TRANSITION FROM THE FIRST OPERATING SYSTEM TO THE │
│ SECOND OPERATING SYSTEM USING THE SYSTEM CONTEXT  │
│         FOR THE SECOND OPERATING SYSTEM           │
│                     806                           │
└─────────────────────────────────────────────┘
```

*FIG. 8*

TECHNIQUES FOR SWITCHING BETWEEN OPERATING SYSTEMS

CROSS-REFERENCE TO RELATED APPLICATIONS

This application is a continuation of, claims the benefit of and priority to previously filed U.S. patent application Ser. No. 14/220,812 filed Mar. 20, 2014, entitled "TECHNIQUES FOR SWITCHING BETWEEN OPERATING SYSTEMS", the subject matter of which is incorporated herein by reference in its entirety.

TECHNICAL FIELD

Embodiments described herein generally relate to techniques for switching between operating system. More specifically, various embodiments are generally directed to using system contexts saved in non-volatile memory to rapidly switch between operating systems.

BACKGROUND

Many computing system today have more than one operating system (OS) capable of being run on the system. However, computing systems generally only boot one operating system at a time on the system. If a second OS is needed, the computing system is powered down and the system is booted up in the new operating system. However rebooting into the new operating system is typically slow.

Furthermore, it is also possible to use multiple OSs on a single computing device by using virtualization to run multiple guest operating systems on top of a single host operating system. However, virtualization does not generally allow each OS direct access to hardware devices, which can reduce performance, particularly for programs that require direct access to high speed peripherals, such as games.

BRIEF DESCRIPTION OF THE DRAWINGS

FIG. 8 illustrates an embodiment of a logic flow diagram.

DETAILED DESCRIPTION

Figure 1:
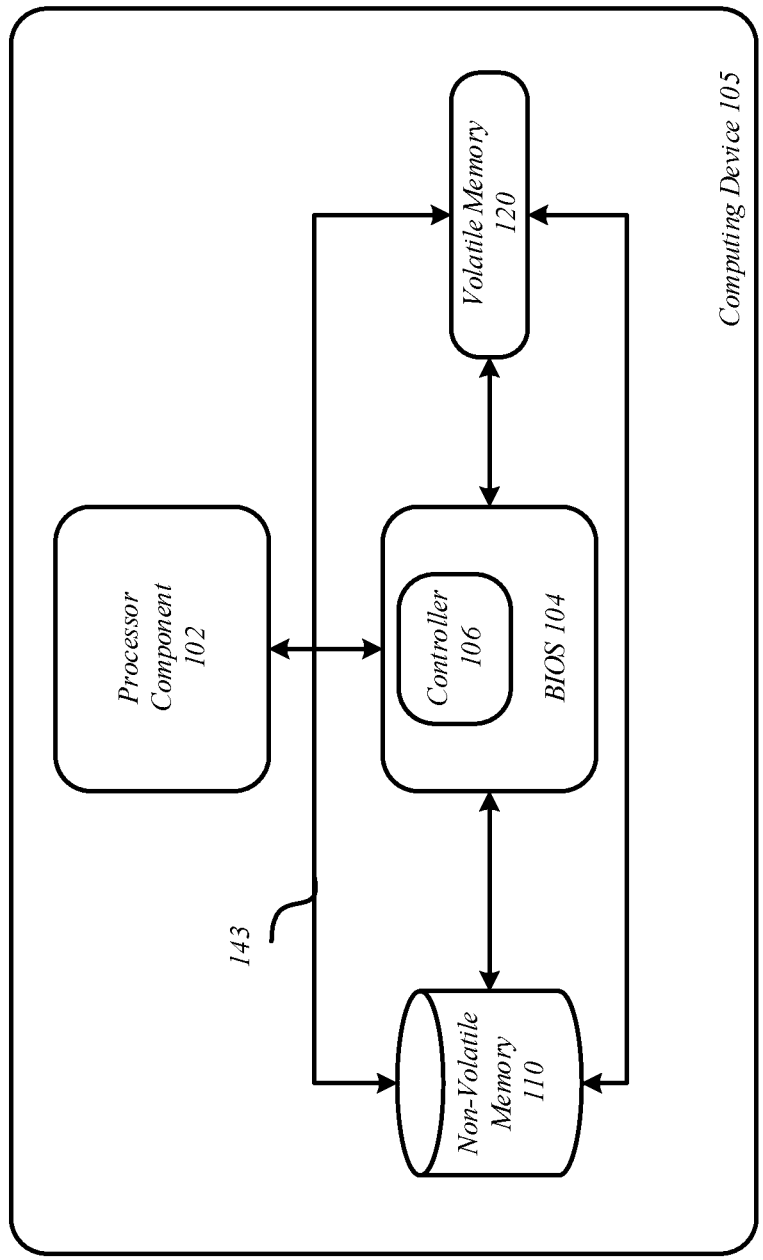
FIG. 1 illustrates an embodiment of a first system.

Various embodiments are generally directed to switching between operating systems on a computing device by utilizing system contexts saved when an operating system is put into a standby or S3 state as defined by the advanced configuration and power interface (ACPI) specification revision 5.0a published Nov. 13, 2013 found at http://acpi.info/spec.htm. More specifically, a controller having logic, at least a portion of which is implemented in hardware may receive a request to switch from the currently running operating system to another operating system. Traditionally, the system would completely shut down the current operating system and then boot the new or other operating system from the beginning, loading all the files and configuration settings into memory and registers. However, this process can take an unreasonably long time.

Thus a system or standby context for the operating systems may be used to switch between operating systems. The standby context may include various configuration settings for an operating system including register settings, application settings, file settings, operating system state settings and so forth. Upon receiving a request to switch the operating systems, the controller may instruct the current operating system to enter the standby state causing the operating system to save a standby context in volatile memory. However, a standby context saved in the volatile memory may be lost when power is cutoff to the memory or may be overwritten by another operating system. Thus, the controller may copy the standby context to a non-volatile memory to save for further use.

When switching to the new operating system, the controller may locate the standby context for the operating system in the non-volatile memory and may copy it to the volatile memory. The standby context for the new operating system may have been saved in the non-volatile memory during a previous switch between operating systems or any other time when the operating system was running. Once the standby context is in the volatile memory, the controller my wake the new operating system from a standby or S3 state using the standby context in the volatile memory. The new operating system may boot and operate in a normal state. Using the standby contexts saved in non-volatile memory to switch between operating systems saves a significant amount of time over a complete shut down and boot up process.

In addition to switching between operating systems, various embodiments may also be directed to putting a system having multiple operating systems into a fast hibernate state and exiting out of the fast hibernate state into anyone of the multiple operating systems. In these embodiments, a controller may receive a request to put a system into a standby or S3 state to save power for the system. Generally when a system is put into the S3 state power is shutoff to various components, such as the processing components, non-volatile memory and so forth, but the power remains on for components such as the volatile memory to hold the standby context, for example. However additional power savings may be realized by putting the system into a hibernation or S4 state when the system requests to enter the standby or S3 state.

Thus, the standby context may be saved by the controller in the non-volatile memory on a persistent basis with or without power, as previously discussed. The system may enter the hibernation or S4 state without the risk of losing the standby context for the operating system. The controller may receive information to put the system into the standby or S3 state and may instruct the running operating system to enter this state. The operating system may copy a standby context to volatile memory and enter an S3 state. The controller may copy the standby context to the non-volatile memory and put the system into the hibernation or S4 state, saving additional power over the S3 state.

In various embodiments, the controller may also receive information to exit the hibernation or S4 state and put the system into a normal operating state. The controller may determine which operating system to boot the system into and copy a standby context for the operating system from the non-volatile memory to the volatile memory and instruct the operating system to exit the standby or S3 state using the standby context. The operating system to boot into may be the last operating system that was running on the system when it entered the hibernation state or a user selected operating system. The user may have selected the operating system when the system was exiting the hibernation or S4 state or when the system was put into the S4 or hibernation state. Various details will become more apparent with the follow description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of a system 100 suitable for implementing various embodiments described herein. The system 100 includes a computing device 105 having various components for processing and enabling switching between operating systems and entering and exiting a fast hibernate state. In various embodiments, the system 100 may have any number of operating systems on it and they may be any type of operating system including but not limited to, a Windows® OS, an Apple® OS, a Linux® OS, a UNIX® OS and so forth.

FIG. 1 illustrates computing device 105 including a processor component 102 coupled with a Basic Input/Output System (BIOS) 104 including a controller 106. Further, the computing device 105 also includes a non-volatile memory 110 and a volatile memory 120. The processor component 102, BIOS 104, non-volatile memory 110 and volatile memory 120 may communicate over one or more interconnects such as interconnects 143 which may be any type of bus, trace, and so forth.

Although FIG. 1 illustrates a specific number of components, various embodiments are not limited in this manner and computing system 105 may include any number of components. Further, FIG. 1 illustrates various components as standalone components or part of other components. For example, FIG. 1 illustrates the BIOS 104 including the controller 106. However, various embodiments may not be limited in this manner and in some embodiments the controller 106 may be a standalone component or not in the BIOS 104. FIG. 1 also illustrates a volatile memory 120 as a standalone component; however, in various embodiments the volatile memory 120 may be part of the processor component 102. In addition, the processor component 102 may have its own volatile memory component. Various embodiments are not limited in this context.

In various embodiments, computing device 105 may include any type of computing device, such as a personal digital assistant, a mobile computing device, a smart phone, a cellular telephone, a handset, a one-way pager, a two-way pager, a messaging device, a computer, a laptop computer, a notebook computer, a handheld computer, a tablet computer, a network appliance, a web appliance, multiprocessor systems, processor-based systems, or any combination thereof. The embodiments are not limited in this context.

Processor component 102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processor component 102 may be connected to and communicate with the other elements of the computing system via the interconnect 143. Further, processor component 102 may include other components, such as an uncore component including logic to process information, instructions, and so forth not essential to core processing.

In various embodiments, the computing device 105 may include a non-volatile memory 110 for storing data, information, and instructions for the computing device 105. the non-volatile memory 110 may be any type of non-volatile memory that may store the data, information, instructions and so forth on a persistent basis when power or no power is applied to the memory. The non-volatile memory 110 may include flash memory, solid state drives (SSD), ferroelectric random access memory (F-RAM), optical disks, read only memory (ROM), non-volatile random access memory (NVRAM), SONOS, programmable metallization cell, Racetrack memory, Nano-RAM, Millipede memory, phase change memory (PCM), and so forth.

In various embodiments, the non-volatile memory 110 may be divided into regions and store one or more operating systems for the computing system 105. More specifically and as will be discussed in further detail below, the non-volatile memory 110 may divided into a number of different partitions and may include operating system space partitions and partitions to save system contexts for each of the operating systems installed or enabled on the computing device 105.

The computing system 105 may also include volatile memory 120 which may be any type of memory that does not store information while power is not applied to the memory. Volatile memory 120 may include, but is not limited to, random access memory (RAM), dynamic random access memory (DRAM), static random access memory (SRAM), T-RAM, Z-RAM, and so forth.

The volatile memory 120 may store information and as will be discussed in more detail below, an operating system may save its standby context in the volatile memory when the system is put into a standby state. The standby context may include open documents and programs (applications) that were used at the time of entering into the standby state. Contents of some chipset registers may also be written to volatile memory as part of the standby context. The standby context may be written to or saved into the non-volatile memory 110 before power is disabled to the volatile memory 120 to save the standby context in a persistent manner. In some embodiments, the standby context may also be used to quickly transition between operating systems In various embodiments, the computing device may include a BIOS 104 having a controller 106 for controlling various aspects of the computing device 105 including switching between operating systems, putting the computing device into a fast hibernate state and resuming from a fast hibernate state. The BIOS 104 provides system BIOS instructions. More specifically, the BIOS software may be built into computing device 105 as firmware and is the first software that is run by the computing device 105 when powered on. The BIOS 104 may initialize and test the system components, and to load a bootloader or an operating system from a memory device, such as the non-volatile memory 110.

Although FIG. 1 illustrates controller 106 as part of BIOS 104 various embodiments may not be limited in this manner and the controller 106 may be a standalone component and may communicate with the other components via interconnect 143. Further, controller 106 may include logic and may be implemented in hardware, software, or combination thereof.

In some embodiments, when switching or transitioning to another operating system, the controller 106 may receive information indicating that a user would like to switch from the current operating system running on the computing device 105 to another operating system installed or operable on the computing device 105. The controller 106 may instruct and send information to the operating system currently running to enter a standby state. By entering the standby state, the operating system may save a standby context including information in various registers and information with respect to open documents and programs (applications) that were used at the time of entering into the standby state. Some or all of the processes of the current operating system may also be stopped once the standby context is copied to the volatile memory.

The controller 106 may copy or copy and remove the standby context saved in the volatile memory 120 to the non-volatile 110 to maintain the information in a persistent state. The standby context may be saved in the non-volatile memory 110 in a specific location associated with the operating system that is being switched from. In various embodiments, the specific location may be a context partition for the operating system.

The controller 106 may then remove the information from the volatile memory 120 or permit the other operating system to overwrite the information. Once the standby context for the operating system is saved in the non-volatile memory 110, the controller 106 may switch to the other operating system. In some embodiments, the controller 106 may determine if a standby context exists in the non-volatile memory 110 for the other operating system or operating system being switch to and may copy the standby context to the volatile memory 120. The controller 106 may instruct the other operating system to exit a standby state using the standby context copied to the volatile memory 120. However, if no standby context exists in the non-volatile memory 110 for the operating system being switched to, the controller 106 may initiate a boot sequence to load a new instance of the operating system.

In various embodiments, the controller 106 may communicate with the operating systems via the processor component 102 utilizing the one or more interconnects 143 by sending messages to and from the operating systems as one or more system calls, function calls or the like. Further, the controller 106 may enable or disable one or more registers or control pins to cause the operating system to enter or exit a various sleep states. Various embodiments are not limited in this manner and the controller 106 may communicate with the operating systems in any manner.

In various embodiments, the controller 106 may enable a user to switch between any number of operating systems by utilizing standby contexts saved in the non-volatile memory 120. The controller 106 may save standby contexts for the operating systems being switched out of into the non-volatile memory 110 and may load standby contexts for the operating systems being switched to into the volatile memory 120. A significant amount of time and processing power may be saved by utilizing the standby context because a complete shutdown and startup sequence for the operating systems is not required. Further, the standby contexts may be used to save configuration and settings for the user so that when the user switches back to the operating system it will be in the same configuration.

The controller 106 may also enable a user to put the computing device 105 into a fast hibernate state and to resume from a fast hibernate state into any one of one or more operating systems by utilizing the standby contexts saved. More specifically, the controller 106 may instruct the operating systems to enter a standby state causing the operating systems to save standby contexts in the volatile memory 120. However, the system may then copy the standby contexts into the non-volatile 110 and actually put the system into a hibernation state.

For example, the controller 106 may receive information from an operating system currently running that a user would like to put the system into a standby state. The information may be received in response to a user selection via a graphical user interface, the closing of a lid (not shown) of the computing device, the pressing or depressing of a button (not shown) of the computing device and so forth.

The operating system currently operating may save a standby context in the volatile memory 120 and the controller 106 may also instruct any other operating systems having running processes to save their standby contexts into the volatile memory 120 as well. The controller 106 may save the standby contexts for each of the operating systems on the computing device 105 into the non-volatile memory 110. In some embodiments, the controller 106 may save the standby contexts in context partitions associated with each of the operating systems.

Once all the standby contexts are saved in the non-volatile memory 110, the controller 106 may put the computing device 105 into a hibernation state by communicating one or more messages, setting a register or enabling one or more pins. When in the hibernation state, the computing system 105 may turn off power to various components including the processor component 102, the volatile memory 120, the non-volatile memory 110 and any other component as defined by the ACPI specification.

The computing device 105 may remain in the hibernation state into a trigger event occurs. In various embodiments, the trigger event may be the opening of a lid, the pressing of a button, a depressing of the button, a movement of a mouse, communication received via a network interface and so forth. The controller 106 may receive information indicating the trigger event has occurred and may initiate a resume process on the computing device 105. The controller 106 may resume any one of the operating systems enabled on the computing device 105 into a normal operating state. The controller 106 may resume the computing device 105 into the last operating system operating on the device, or into an operating system based on a user selection received when the device was put into the fast hibernation state or may receive a user selection during the initial boot process when coming out of the hibernation state. More specifically, a user may be presented with a selection list to select an operating system to boot the computing device 105 into.

Once the controller 106 determines the operating system to boot into, the standby context for the operating system may be copied from the non-volatile memory 120 into the volatile memory 110. The standby context may be located in a context partition of the non-volatile memory 110 and the context partition may be associated with the operating system to boot into. The controller 106 may instruct the operating system to exit a standby state on the computing device 105 using the standby context and into the same configuration saved in the standby context. In some embodiments, a standby state may not be saved for the operating system the computing device 105 is to load into and the controller 106 may initiate a complete boot process for the operating system. In some embodiments, resuming using the standby context for an operating system will occur more quickly than booting a new instance of the operating system.

Figure 2:
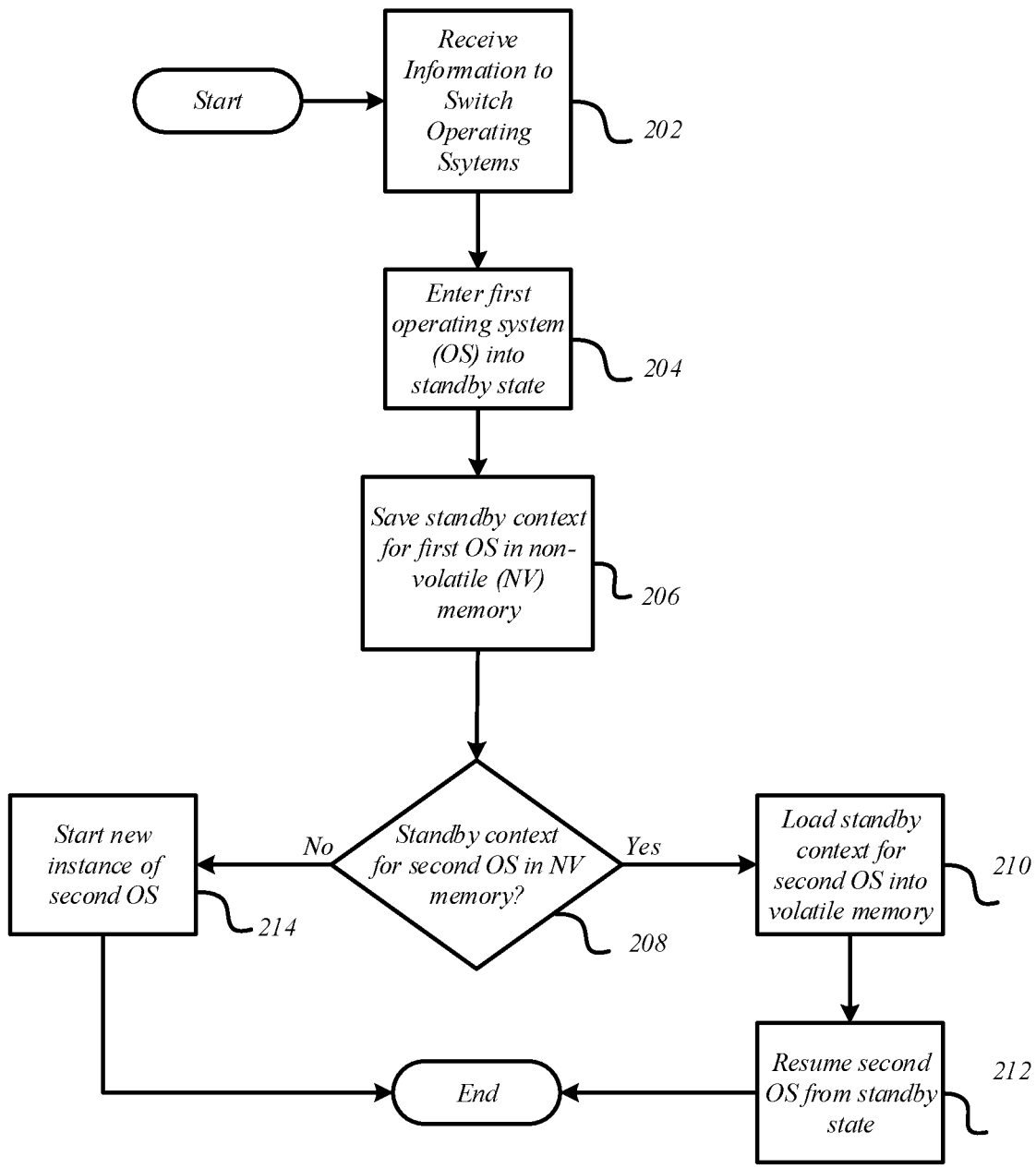
FIG. 2 illustrates a logic flow for switching between operating systems.

FIG. 2 illustrates an exemplary embodiment of logic flow 200 for switching between operating systems. Logic flow 200 is discussed with reference to computing device 105 of FIG. 1 for illustrative purposes. However, various embodiments are not limited in the manner and the logic flow may be implemented on any computing system or device.

At block 202, a controller 106 may receive information to switch between an operating system. More specifically, the information may indicate that a user wishes to switch from a first operating system to a second operating system. As previously discussed, the first operating system and second operating system may be any type of operating system including a Windows OS®, an Apple OS®, a Linux OS®, a UNIX OS®, and so forth. The information may be generated by a user selection via a graphical user interface while operating within the first operating system and may be received by a controller 106. In some embodiments, the computing device 105 may have any number of operating systems enabled on it and the information may also indicate which operating system the user wishes to switch to.

In various embodiments, the controller 106 may instruct the first operating system to enter into a standby state, such as the S3 state defined by the ACPI specification at block 204. The first operating system may save a standby context in volatile memory 120 when entering the S3 state. The standby context may include various configuration settings for the first operating system including register settings, application settings, file settings, operating system state settings and so forth.

In various embodiments, the logic flow 200 may include copying or saving the standby context for the first operating system in the non-volatile memory 110 at block 206. In various embodiments, the controller 106 may copy the standby context for the first operating system from the volatile memory 120 to the non-volatile memory 110. More specifically, the controller 106 may copy the standby context into a first context partition associated with the first operating system to save the standby context in a persistent manner. In some embodiments, the controller 106 may remove the standby context from the volatile memory 120 once it is copied to the non-volatile memory 110. However, in the same or other embodiments the controller 106 may allow the standby context to remain in the volatile memory 120.

At decision block 208, the controller 106 may determine whether a standby context for the second operating system exists or does not exist in the non-volatile memory 110. If a standby context for the second operating system exists in the non-volatile memory, the controller 106 may copy the standby context from the non-volatile memory 110 to the volatile memory 120 at block 210. In various embodiments, the standby context may be copied from a second context partition associated with the second operating system to the volatile memory 120.

In various embodiments, the controller 106 may initiate or instruct the second operating system to exit a standby state or S3 state at block 212. The second operating system may exit the standby state using the standby context for the second operating system loading into the volatile memory 120 by the controller 106. In some embodiments, the second operating system may receive information to exit the standby via the controller 106 enabling or setting a register, setting a pin, a system call and so forth. The second operating system may exit the standby state and operate in a normal operating state.

If at decision block 208, the second operating system does not have a standby context saved in the non-volatile memory 110, the controller 106 may initiate a new instance of the second operating system at block 214. The second operating system may load like any operating system booting from a power off state.

Although logic flow 200 illustrates a number blocks in a certain order, various embodiments are not limited in this manner and the blocks of logic flow 200 may occur in any order. In addition, logic flow 200 may be repeated any number of times and the computing device may switch between any number of operating systems.

Figure 3:
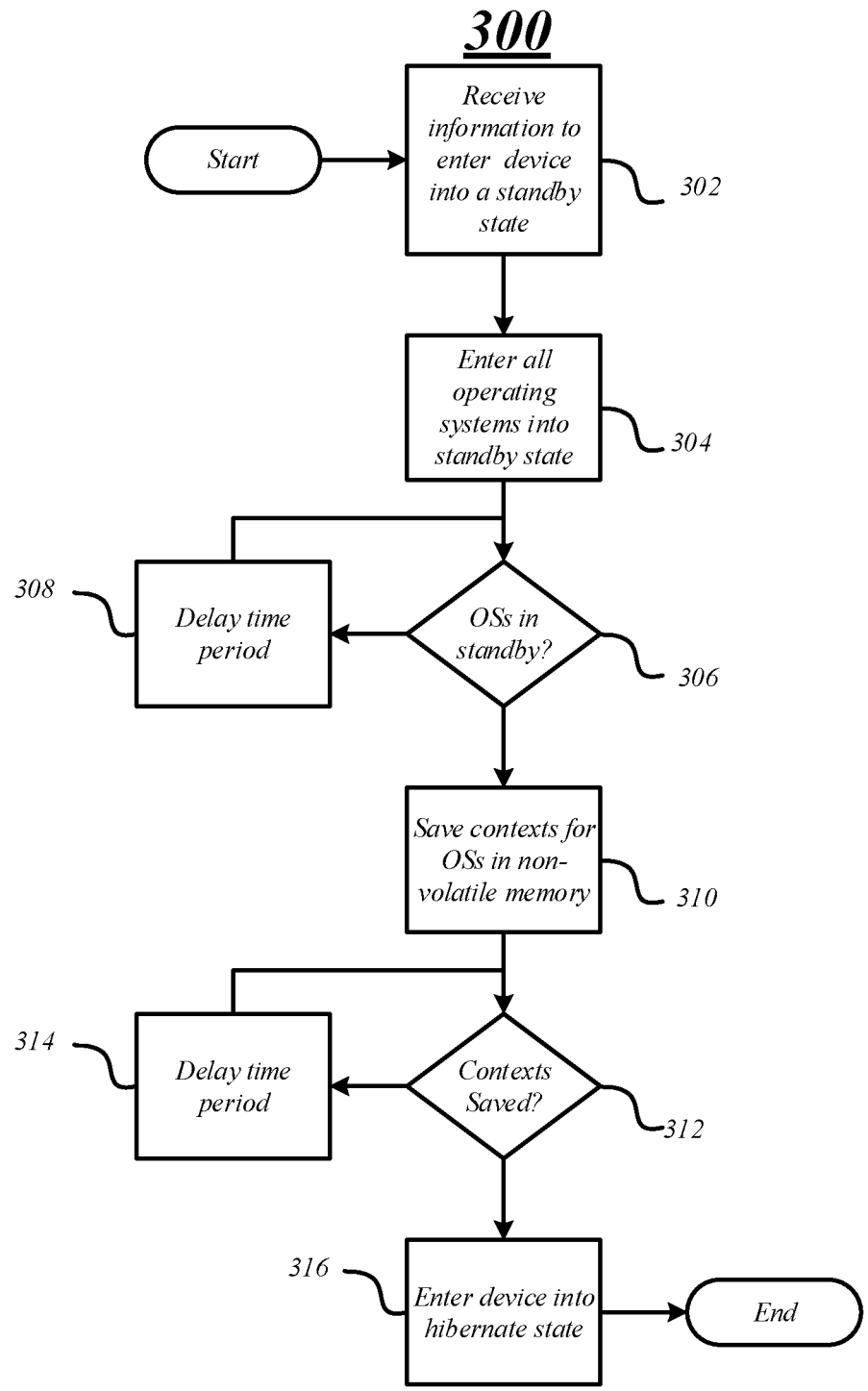
FIG. 3 illustrates a logic flow to put operating systems into a fast hibernate state.

FIG. 3 illustrates an exemplary embodiment of logic flow 300 for putting operating systems into a fast hibernate state. Logic flow 300 is discussed with reference to computing device 105 and components of FIG. 1 for illustrative purposes. However, various embodiments are not limited in the manner and the logic flow may be implemented on any computing system or device.

At block 302, a controller 106 may receive information to put a computing device 105 into a standby state. However in response to receiving the request to put the computing device 105 into the standby state the controller 106 may put the computing device 105 into a fast hibernate state and save the standby contexts in a persistent manner in non-volatile memory 110. Further, the information to put the computing device 105 into the standby state may be received based trigger events such as a user selection, a closing of a computer lid, a pressing of a button and so forth.

In various embodiments, the controller 106 may instruct or send information to all the operating systems having one or more processes running on the computing device 105 to enter into a standby state at block 304. Each operating system may enter a standby state and save a standby context in the volatile memory 120 to use when exiting the standby state. As previously discussed, the standby contexts for each operating system may include configuration information for the operating system. Further, the controller 106 may determine if each operating system having one or more processes running on the computing device 106 is in a standby state at decision block 306.

If at decision block 306 the controller 106 determines that each operating system is not in a standby state, the controller 106 may wait a delay time period at block 308 and check again whether all the operating systems are in a standby state. The time period may be any time period in seconds, millisecond, microseconds, nanoseconds and so forth. For example, the controller 106 may wait 1 millisecond and check again whether the all the operating systems are in the standby state or not. Various embodiments are not limited to this example and the delay time period may be any amount of time. This process may be repeated until all of the operating systems are in a standby state or until a specific number of determinations have been made.

If at decision block 306 the controller 106 determines that each operating system is in the standby state, the controller 106 may copy each standby context from the volatile memory 120 into the non-volatile memory 110 in each of the operating systems respective context partitions at block 310. For example, the controller may copy a standby context for a first operating system from the volatile memory 120 to a first context partition of the non-volatile memory 110 and a standby context for a second operating system to a second context partition of the non-volatile memory 110. The controller 106 may copy the standby context for any number of operating systems.

At decision block 312, the controller 106 may determine if all standby contexts for each of the operating systems are copied to the non-volatile memory 110. If the standby contexts have not completely copied to the non-volatile memory 110, the controller may wait a delay time period at block 314. The controller 106 may continue to wait the delay time period a number of times until all of the standby contexts have been copied to the non-volatile memory 110. The delay time period may be any time period.

If at block 312, the controller 106 determines all of the standby contexts have been copied to the non-volatile memory 110, the controller 106 may put the computing device 105 into a hibernate or S4 state, as defined by the ACPI specification at block 316. The computing device 105 may remain in the hibernate state until a trigger event is received by the controller 106 or computing device 105, in some embodiments.

Figure 4:
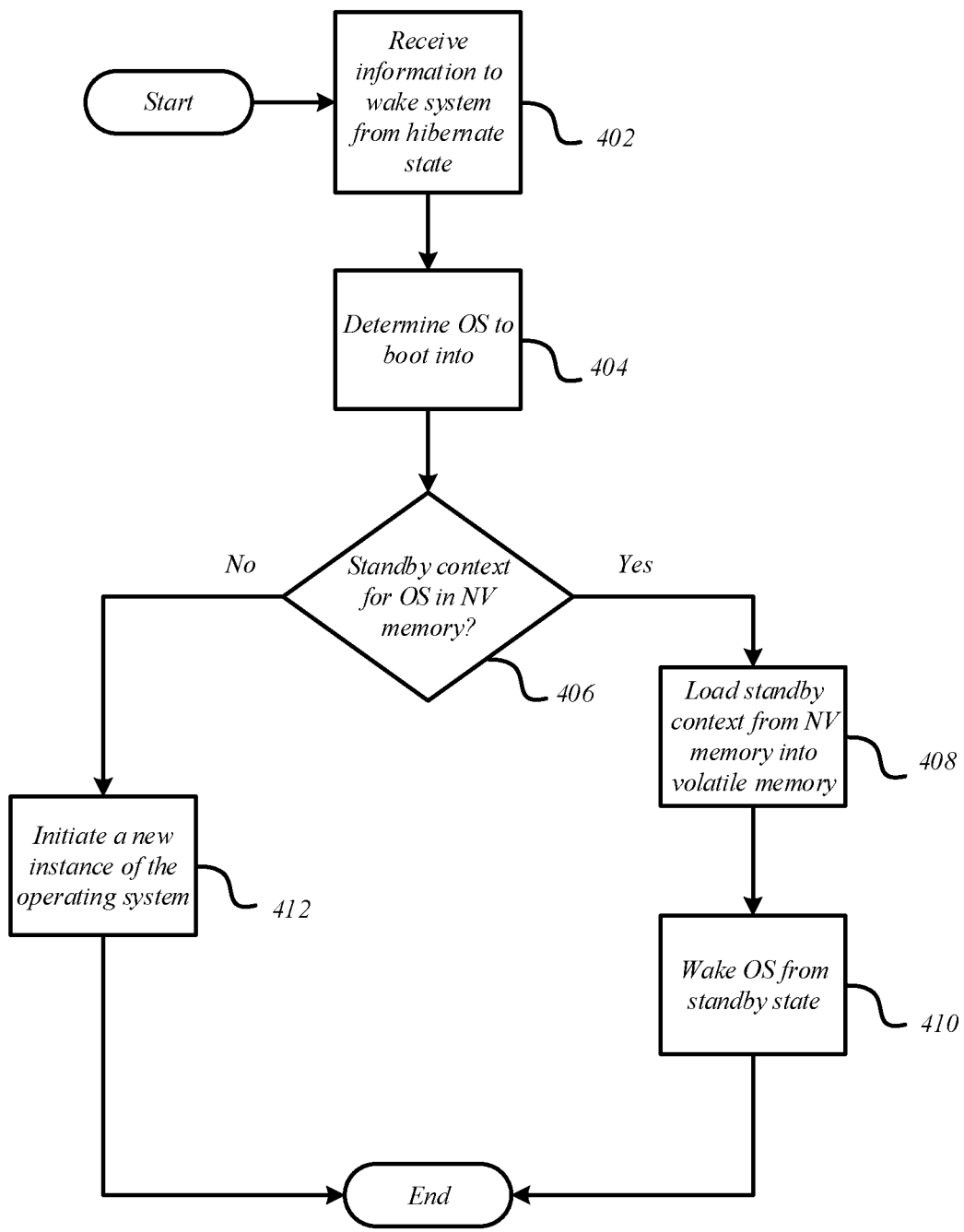
FIG. 4 illustrates a logic flow for operating systems to exit a fast hibernate state.

FIG. 4 illustrates an exemplary embodiment of logic flow 400 for exiting a fast hibernate state for operating systems. Logic flow 400 is discussed with reference to computing device 105 and components of FIG. 1 for illustrative purposes. However, various embodiments are not limited in the manner and the logic flow may be implemented on any computing system or device.

At block 402, a controller 106 may receive information to wake a system or computing device 105 from a fast hibernate state. The controller 106 may receive the information in response to trigger event such as the opening of a computer lid, the pressing or depressing of a button, information received via a network connection, the movement of a mouse or on a trackpad, and so forth. Various embodiments are not limited in this manner and the controller 106 may receive the information based on any number of trigger events. Further, the controller 106 may receive the information via a communication such as one or more signals, a setting of a pin or register and so forth.

In various embodiments, the controller 106 may determine which operating system to boot into for the computing device 105. The controller's 106 determination may be based on information received when the computing system 105 was put into the fast hibernate state. For example, the controller 106 may have received information indicating which operating system to load when resuming from the fast hibernate state. In addition, the controller 106 may resume into the operating system the computing device 105 was last in when the device was put into the fast hibernate state. The controller 106 may also enable a user interface or menu for a user to make a selection of which operating system to load into during the initial boot sequence.

The controller 106 may determine whether a standby context exists in non-volatile memory 110 for the operating system the computing device 105 is to boot into at decision block 406. If the controller 106 determines that a standby context exists for the operating system, the controller 106 may load the standby context into the volatile memory 120 at block 408. In various embodiments, the standby context may be loaded from a context partition of the non-volatile memory 110 associated with the operating system into the volatile memory 120. The controller 106 may wake the operating system from a standby state into a normal operating system at block 410. The controller 106 may send information as system call, enablement of a register, a setting of a pin and so forth to wake the operating system and the operating system may use the standby context loaded into the volatile memory to resume from the standby state.

If at block 406, the controller 106 determines that a context for the operating system does not exist in the non-volatile 110, the controller 106 may initiate a new instance of the operating system at block 412. The new instance of the operating system may go through a normal or complete boot process when being boot into and may operate in a normal state once it has completely booted up.

Figure 5:
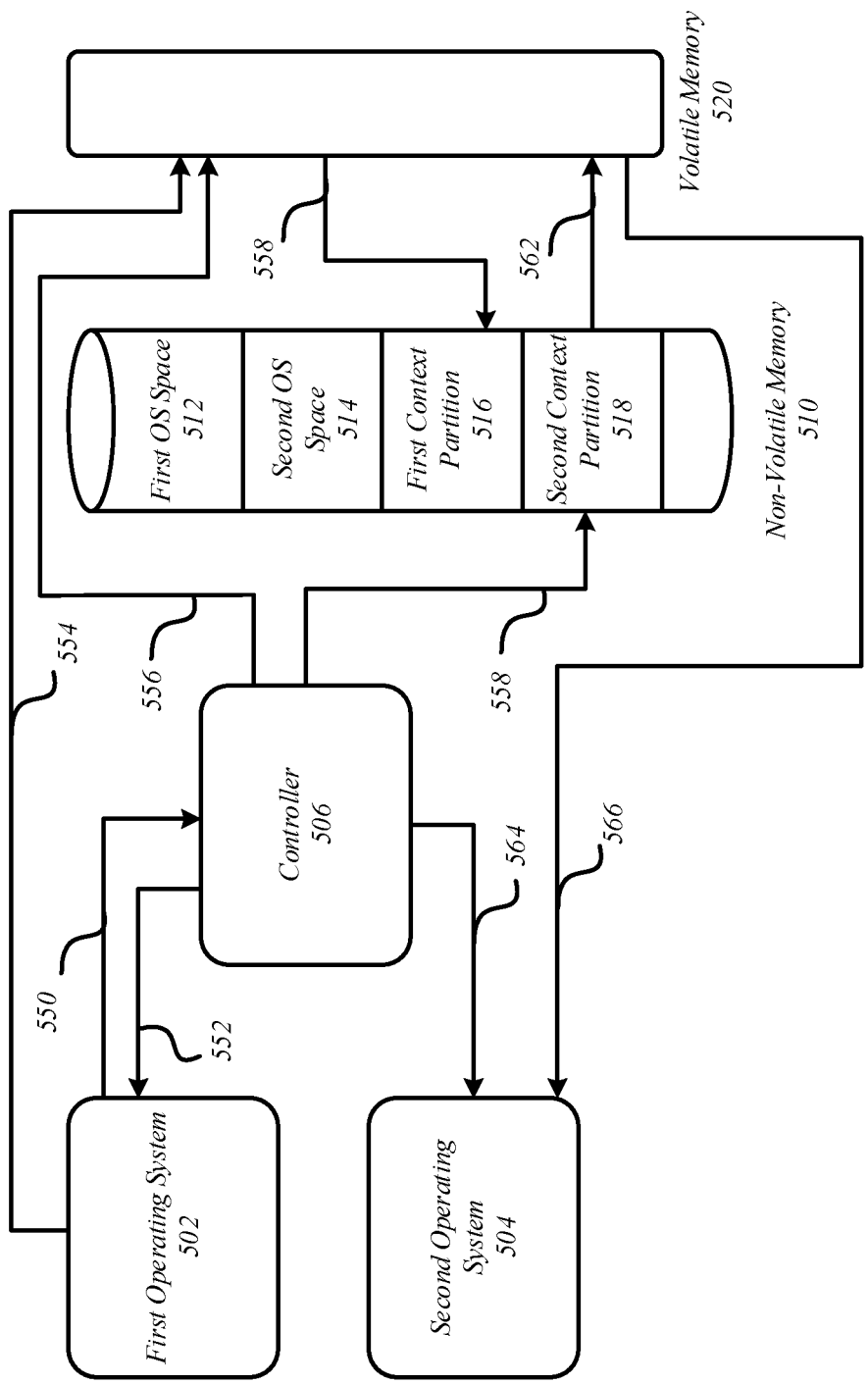
FIG. 5 illustrates a block flow diagram for switching between operating systems.

FIG. 5 illustrates a component flow diagram 500 for switching between a first operating system and a second operating system. The component flow diagram 500 illustrates the communication between various components of a computing system, such as computing device 105. FIG. 5 includes a first operating system 502, a second operating 504, a controller 506, a non-volatile memory 510 and a volatile memory 520. In some embodiments, the controller 506, the non-volatile memory 510 and the volatile memory 520 may be similar to or the same as the same labeled components of FIG. 1. However, various embodiments are not limited in this manner.

Further, the non-volatile memory 510 may be divided into any number of regions or partitions include a first operating system space 512 for the first operating system 502, a second operating system space 514 for the second operating system 504, a first context partition 516 and a second context partition 518. The operating system space for the operating systems may be dedicated space in the non-volatile memory 510 for the corresponding operating systems to store data, information, files, applications and so forth. Each operating system may have a dedicate operating system space to ensure that information is not written over by another operating system. In some embodiments, the operating system space may be a partition of the non-volatile memory 510.

As previously discussed, each operating system may include a standby context partition in the non-volatile memory 510. As illustrated in FIG. 5, the first operating system 502 may be associated with the first context partition 516 and the second operating system 504 may be associated with the second context partition 518. The standby context partition may store a standby context for the associated operating system to enable switching between operating systems, entering fast hibernate with multiple operating systems and to exiting fast hibernate with multiple operating systems. Each operating system of a computing device may include a corresponding or associated standby context partition.

FIG. 5 illustrates various communications between the components of a computing system. In the illustrated exemplary embodiment, a user may be operating the computing device in the first operating system 502. At line 550, the controller 506 may receive information from the first operating system 502 indicating that the user wishes to switch from the first operating system 502 to the second operating system 504. In response to receiving the information, the controller 506 may communicate or instruct the first operating system 502 to enter a standby state at line 552. The communication may be made in any form including a system or function call, setting a register and so forth.

In various embodiments, the first operating system 502 may receive the instruction to enter the standby state and may save a standby context in the volatile memory 520 as indicated by line 554. The standby context may include operating system settings, registers, application settings, files and so forth. Although FIG. 5 illustrates line 554 going from the first operating system 502 to the volatile memory, the standby context information may come from various components of the device, such as locations in the volatile memory itself or from the first OS space 514. In some embodiments, the information may be determined by one or more processor components (not shown) and saved in the volatile memory 520.

The controller 506 may copy the standby context from the volatile memory 520 to the non-volatile memory 510 as indicated by lines 556 and 558. More specifically, the standby context may be saved in a first context partition 516 associated with the first operating system 502. Once the standby context for the first operating system 502 is copied to the non-volatile memory 510, the controller 506 may determine that a standby context for the second operating system 504 is saved in the second context partition 518 associated with the second operating system 504 at line 560. Further, the standby context for the second operating system may then be copied to the volatile memory 520 from the second context partition 518 as indicated by line 562.

In some embodiments, the controller 506 may wake the second operating system 504 from a standby state via a communication such as a function or system call, setting a register, or enabling/disabling a pin at line 564. The second operating system 504 may wake from the standby state using the standby context copied into the volatile memory 520 as indicated by line 566. The second operating system 504 may then operate in a normal operating state. Further, a standby context for the first operating system 502 may be saved and persisted in the non-volatile memory 520.

FIG. 5 illustrates one exemplary embodiment for switching operating system. However, various embodiments are not limited in this manner and any operating system may be switched to another operating system.

Figure 6:
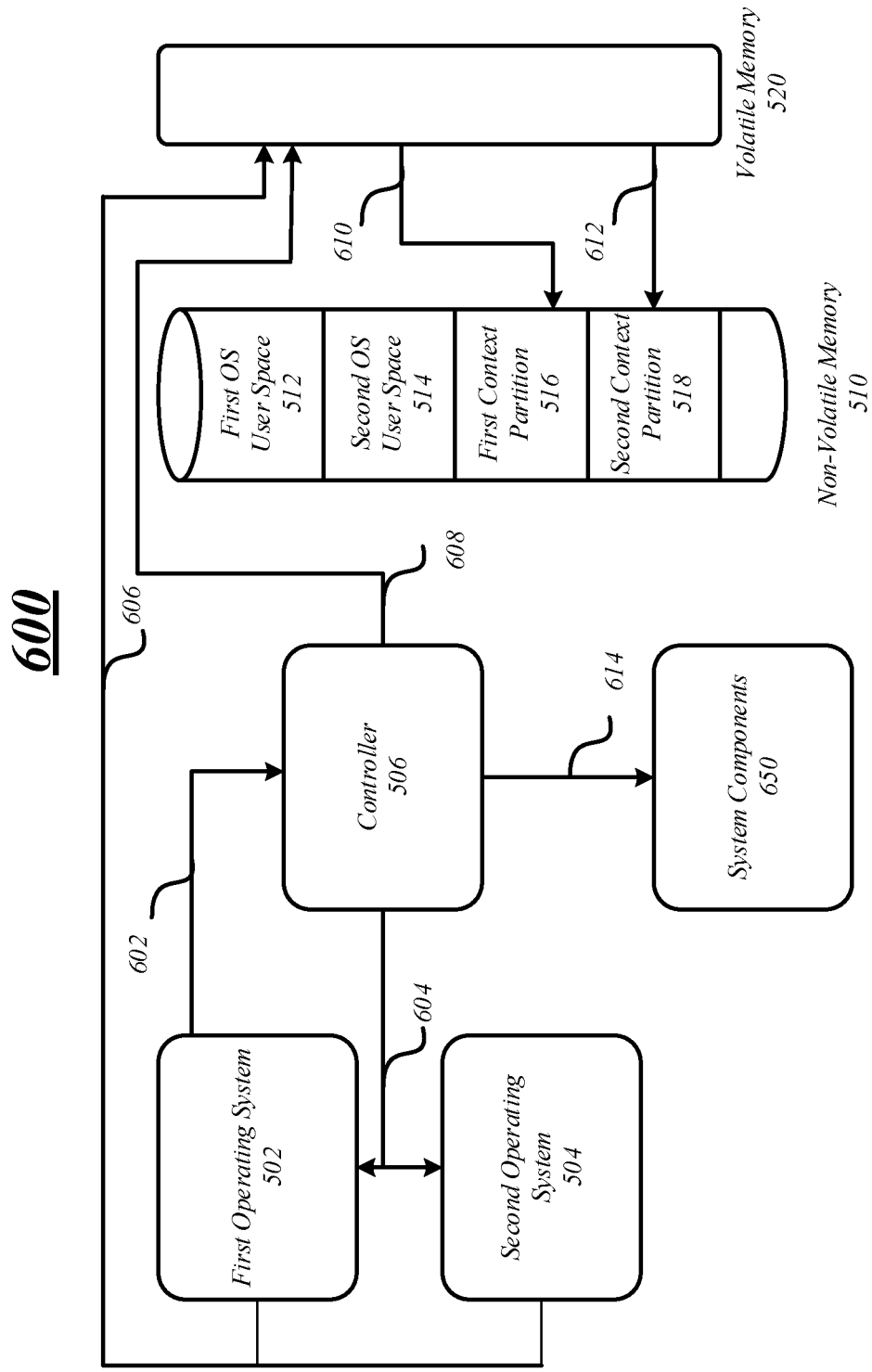
FIG. 6 illustrates a block flow diagram for putting operating systems into a fast hibernate state.

FIG. 6 illustrates a component flow diagram 600 to enter a computing device having multiple operating systems into a fast hibernate state. The component flow diagram 600 illustrates the communication between various components of a computing system, such as computing device 105.

At line 602, the controller component 506 may receive information from the first operating system 502 indicating that a user wishes to put the computing system or device into a standby state. The controller component 506 may receive the information via a processor component (not shown) or by the first operating system 502 setting a register or enabling/disabling a pin. Although, FIG. 6 illustrates the information coming from the first operating system 502, in some embodiments the information may come from the second operating system 504 or any other operating system the user is currently operating the system in.

In various embodiments, the controller 506 may instruct the operating systems to enter into a standby state at line 604. In the illustrated example two operating systems may have processes running in parallel and the controller 506 sends information to both operating systems. However, various embodiments are not limited in this manner and the computing device may have any number of operating system running on it at the same. In some embodiments, the computing device may only have one operating system running on it. As previously discussed, the controller 506 may instruct the operating systems via system or function calls, setting a register, enabling/disabling a pin, and so forth.

The operating systems 502, 504 may enter the standby state and may each save standby contexts in the volatile memory 520 as indicated by line 606. In various embodiments, any number of operating systems may save standby contexts in the volatile memory. At line 608, the controller 506 may initiate a copy of the standby contexts from the volatile memory 520 to the non-volatile memory 510. Moreover, the standby context for the first operating system 502 may be copied to the first context partition 516 as indicated by line 610. The standby context for the second operating system 504 may be copied to the second context partition 518 as indicated by line 612. As previously discussed, any number of system contexts may be copied to a context partition of the non-volatile memory 510.

The controller 506 may determine that all of the standby contexts have been copied to the non-volatile memory 510 and may put the computing system into a hibernate state as indicated by line 614. More specifically, various components including the processor components, the memory components, and so forth may be put into a hibernate state as defined by the ACPI specification.

Figure 7A:
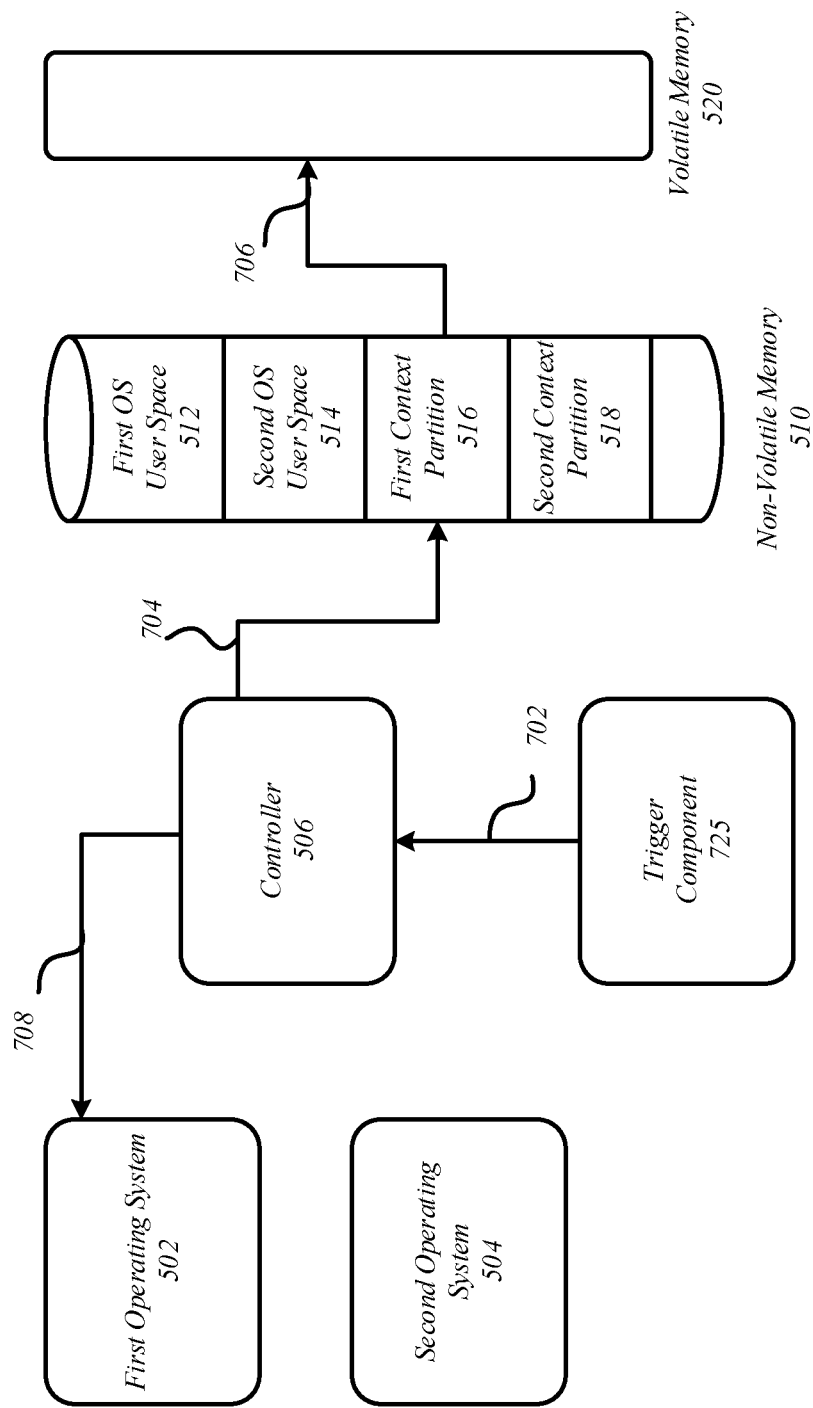
FIGS. 7A/7B illustrate block flow diagrams for operating systems to exit a fast hibernate state.

FIGS. 7A/7B illustrate component block flow diagrams 700 and 750 for a system having multiple operating systems to exit a fast hibernate state. The component flow diagrams 700/750 illustrate communications between various components of a computing system, such as computing device 105.

Figure 7B:
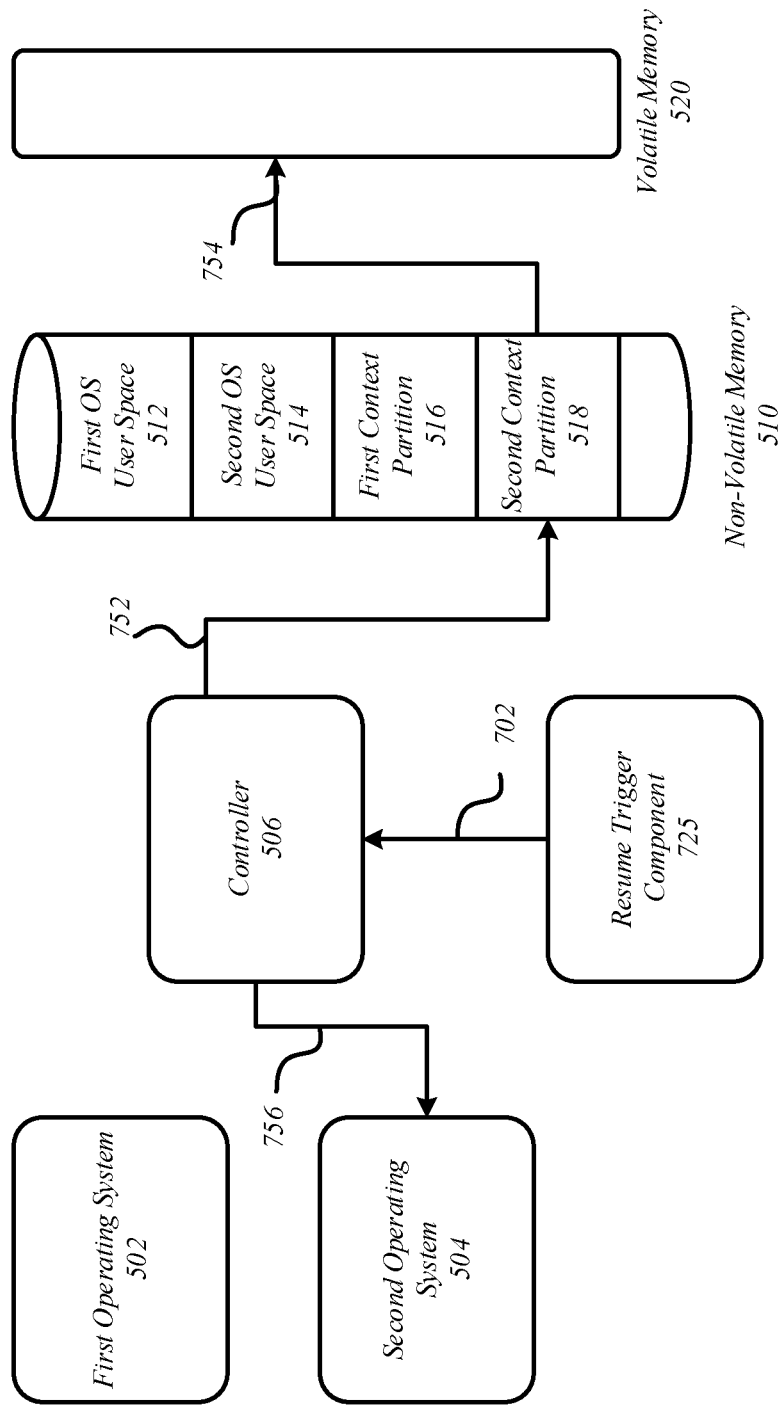

Although FIGS. 7A and 7B illustrate a system having two operating systems, various embodiments are not limited in this manner and the system may have any number of operating systems. FIG. 7A illustrates a system exiting the fast hibernate state and booting into the first operating system 502 and FIG. 7B illustrates a system exiting the fast hibernate state and booting into the second operating system 504.

At line 702, the controller 506 may receive a trigger event from a trigger component 725 to initiate an exit out of a fast hibernate state. The trigger component 725 may be any component capable of triggering the system to exit one or more states, including the fast hibernate state. For example, the trigger component 725 may be a latch on a lid of a computing device, a button, a network interface, a mouse, a trackpad, and so forth. Further, the trigger event may be any event capable of being detected by the trigger component 725. For example, the trigger event may be an opening or closing of a lid, a pressing or depressing of a button, information received over a network interface, a movement of a mouse or on a trackpad, and so forth. Various embodiments are not limited to the above-recited examples.

In various embodiments, the controller 506 may receive the trigger event and determine the operating system to boot into while resuming out of the fast hibernate state. The operating system may be the last operating system the computing device was in or a user selected operating system. The user may have selected the operating while the device was exiting the fast hibernate state or when the device was put into the fast hibernate state.

In this exemplary embodiment, the system may boot into the first operating system 502 and the controller may initiate a copy of a standby context for the first operating system from the first context partition 516 to the volatile memory 520 as indicated by line 704. The standby context may be copied to the volatile memory as indicated by line 706. The first operating may then be capable of using the standby context for the first operating system to boot up.

As previously discussed, although the system is in a fast hibernate state, the operating systems were configured and put into a standby state. Thus, the controller 506 may send information to the first operating system 502 to exit a standby state at line 708. The first operating system 502 may exit the standby state using the standby context in the volatile memory and boot into a normal operating state.

FIG. 7B is similar to FIG. 7A, however, the system boots into the second operating system 504. At line 702, the controller 506 may receive a trigger event to exit the fast hibernate. The controller 506 may determine that the system is to boot into the second operating system 504 and initiate a copy of a standby context for the second operating system 504 from the second context partition 518 to the volatile memory 520 at line 752. Further, the standby context may be copied to the volatile memory 520 at line 754. Finally, the controller 506 may initiate an exit out of a standby state for the second operating system 504 at line 756. The second operating system 504 may use the standby context in the volatile memory 520 to boot into a normal operating state.

FIGS. 7A and 7B illustrate the first operating system 502 and the second operating system 504 using standby contexts saved in the non-volatile memory to exit the fast hibernate state. However, in some instances, a standby context may not exist for the operating systems. In these instances, the controller 506 may initiate a new instance of the operating system on the system and the boot sequence may start from the beginning.

FIG. 8 illustrates an exemplary embodiment of logic flow 800. The logic flow 800 may be representative of some or all of the operations executed by one or more embodiments described herein. For example, the logic flow 800 may illustrate operations performed by the system 100 and 900.

In the illustrated embodiment shown in FIG. 8, the logic flow 800 may include receiving information to invoke a transition from a first operating system to a second operating system at block 802. For example, a controller may receive information from an operating system indicating that a user wishes to transition from the operating currently being used to a different operating system. In various embodiments, a user may make a selection via any means including using a graphical user interface (GUI), a key sequence, a mouse movement, a trackpad movement, and so forth to invoke the transition. The operating system may receive the information to invoke the transition and communicate the information to a controller using any communication or signaling technique including making a call, setting a register and enabling or disabling a pin.

At block 804, the logic flow 800 may include copying a system context for the second operating system from a second location of a non-volatile memory to a volatile memory, the second location associated with the second operating system. For example, a controller may determine that a system context for the second operating system exists in a location, such as a partition of a non-volatile memory. The controller may copy the system context in the partition for the second operating system to the volatile memory.

In various embodiments, the logic flow 800 may include transitioning from the first operating system to the second operating system using the system context for the second operating system at block 806. More specifically, the second operating system may use the system context loaded in the volatile memory to exit a standby state and operate in a normal operating state. In some embodiments, the controller may instruct the first operating system to enter a standby state and may save a system context for the first operating system in a first location when the first operating system transitions to the second operating systems. However, various embodiments are not limited in this manner.

Figure 9:
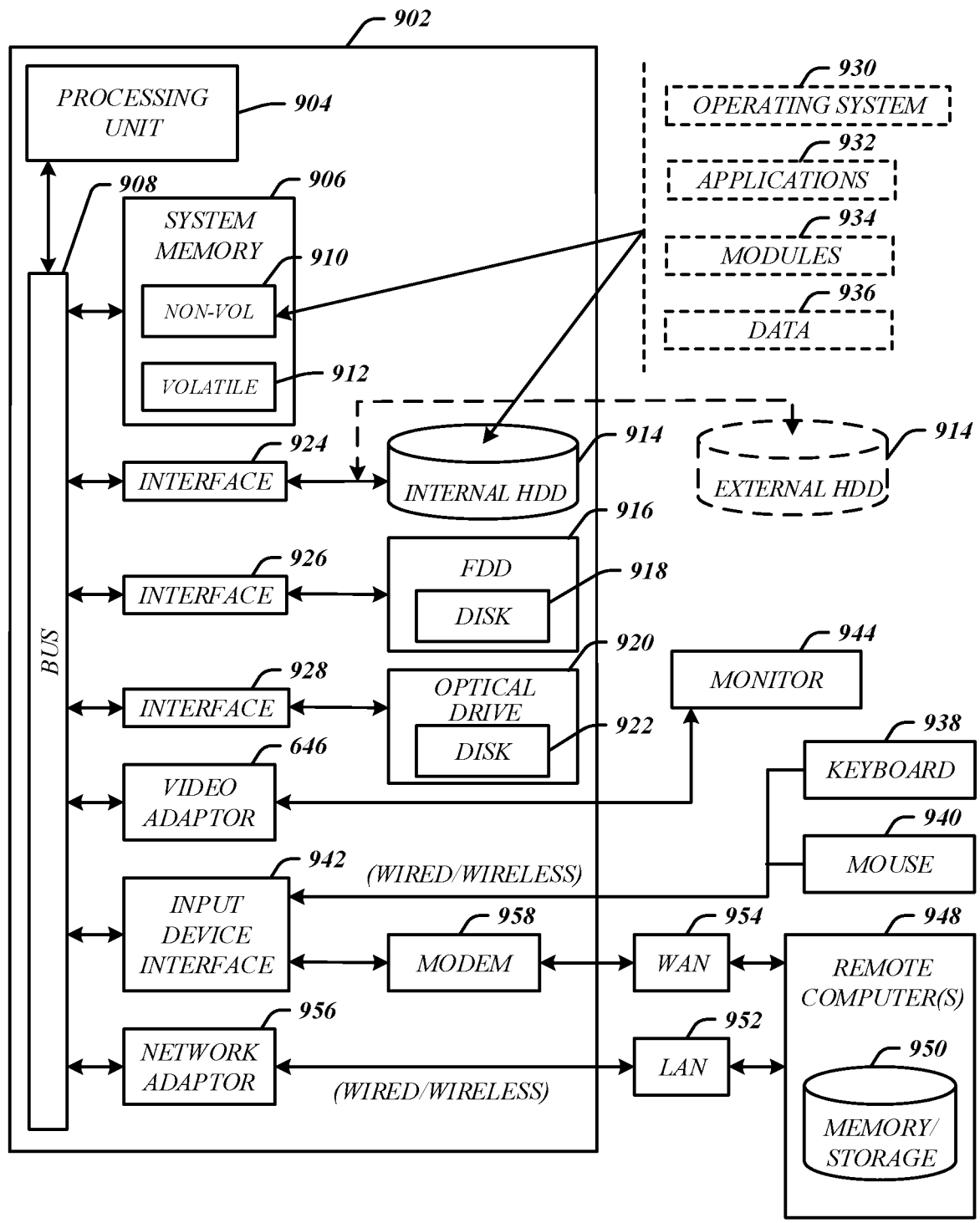
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of or system 100 and computing device 105.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, such as those described with reference to the processor component 102 shown in FIG. 1.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 105.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 100 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three (1-33) provided below are intended to be exemplary and non-limiting.

In a first example, a system or an apparatus, comprising logic, at least a portion of which is in hardware, the logic to receive information to invoke a transition from a first operating system to a second operating system, copy a system context for the second operating system from a location of a non-volatile memory to a volatile memory, the location associated with the second operating system. The logic may also transition from the first operating system to the second operating system using the system context for the second operating system.

In a second example and in furtherance of the first example, an apparatus comprising logic to put the first operating system into a sleep state comprising a cessation of processes running for the first operating system.

In a third example and in furtherance of any of the previous examples, an apparatus comprising logic to receive information to invoke the transition from the first operating system to the second operating during a boot-up process or during operation of the first operating system.

In a fourth example and in furtherance of any of the previous examples, an apparatus comprising logic to enable a user selection in a graphical user interface of the first operating system to invoke the transition from the first operating system to the second operating system.

In a fifth example and in furtherance of any of the previous examples, an apparatus comprising logic to save a system context for the first operating system in a another location of the non-volatile memory, the other location associated with the first operating system.

In a sixth example and in furtherance of any of the previous examples, an apparatus comprising logic to receive information to invoke a transition from the second operating system to the first operating system, copy the system context for the first operating system from the other location of the non-volatile memory to the volatile memory, and transition from the second operating system to the first operating system using the system context for the first operating system.

In a seventh example and in furtherance of any of the previous examples, an apparatus comprising logic to save a new system context for the second operating system in the location of the non-volatile memory prior to transition from the second operating system.

In an eighth example and in furtherance of any of the previous examples, an apparatus comprising logic to put the second operating system into a sleep state comprising a cessation of processes running for the second operating system.

In a ninth example and in furtherance of any of the previous examples, wherein the location comprising a partition of the non-volatile memory and the other location comprising a different partition of the non-volatile memory.

In a tenth example and in furtherance of any of the previous examples, an article comprising a computer-readable storage medium comprising a plurality of instructions that when executed enable processing circuitry to receive information to invoke a transition from a first operating system to a second operating system, copy a system context for the second operating system from a location of a non-volatile memory to a volatile memory, the location associated with the second operating system, and transition from the first operating system to the second operating system using the system context for the second operating system.

In an eleventh example and in furtherance of any of the previous examples, a storage medium comprising instructions that when executed enable processing circuitry to put the first operating system into a sleep state comprising a cessation of processes running for the first operating system.

In a twelfth example and in furtherance of any of the previous examples, a storage medium comprising instructions that when executed enable processing circuitry to receive information to invoke the transition from the first operating system to the second operating during a boot-up process or during operation of the first operating system.

In a thirteenth example and in furtherance of any of the previous examples, a storage medium comprising instructions that when executed enable processing circuitry to enable a user selection in a graphical user interface of the first operating system to invoke the transition from the first operating system to the second operating system.

In a fourteenth example and in furtherance of any of the previous examples, a storage medium comprising instructions that when executed enable processing circuitry to save a system context for the first operating system in another location of the non-volatile memory, the other location associated with the first operating system.

In a fifteenth example and in furtherance of any of the previous examples, a storage medium comprising instructions that when executed enable processing circuitry to receive information to invoke a transition from the second operating system to the first operating system, copy the system context for the first operating system from the other location of the non-volatile memory to the volatile memory, and transition from the second operating system to the first operating system using the system context for the first operating system.

In a sixteenth example and in furtherance of any of the previous examples, a storage medium comprising instructions that when executed enable processing circuitry to save a new system context for the second operating system in the location of the non-volatile memory.

In a seventeenth example and in furtherance of any of the previous examples, a storage medium comprising instructions that when executed enable processing circuitry to put the second operating system into a sleep state comprising a cessation of processes running for the second operating system.

In an eighteenth example and in furtherance of any of the previous examples, wherein a location comprises a partition of the non-volatile memory and the other location comprising a different partition of the non-volatile memory.

In a nineteenth example and in furtherance of any of the previous examples, a method may include receiving information to invoke a transition from a first operating system to a second operating system, copying a system context for the second operating system from a location of a non-volatile memory to a volatile memory, the location associated with the second operating system, and transitioning from the first operating system to the second operating system using the system context for the second operating system.

In a twentieth example and in furtherance of any of the previous examples, a method may include putting the first operating system into a sleep state comprising a cessation of processes running for the first operating system.

In a twenty-first example and in furtherance of any of the previous examples, a method may include receiving information to invoke the transition from the first operating system to the second operating during a boot-up process or during operation of the first operating system.

In a twenty-second example and in furtherance of any of the previous examples, a method may include enabling a user selection in a graphical user interface of the first operating system to invoke the transition from the first operating system to the second operating system.

In a twenty-third example and in furtherance of any of the previous examples, a method may include saving a system context for the first operating system in another location of the non-volatile memory, the other location associated with the first operating system.

In a twenty-fourth example and in furtherance of any of the previous examples, a method may include receiving information to invoke a transition from the second operating system to the first operating system, copying the system context for the first operating system from the other location of the non-volatile memory to the volatile memory, and transitioning from the second operating system to the first operating system using the system context for the first operating system.

In a twenty-fifth example and in furtherance of any of the previous examples, wherein a location may include a partition of the non-volatile memory and the other location comprising a different partition of the non-volatile memory.

In a twenty-sixth example and in furtherance of any of the previous examples, an apparatus may include means for receiving information to invoke a transition from a first operating system to a second operating system, means for copying a system context for the second operating system from a location of a non-volatile memory to a volatile memory, the location associated with the second operating system, and means for transitioning from the first operating system to the second operating system using the system context for the second operating system.

In a twenty-seventh example and in furtherance of any of the previous examples, an apparatus may include means for putting the first operating system into a sleep state comprising a cessation of processes running for the first operating system.

In a twenty-eighth example and in furtherance of any of the previous examples, an apparatus may include means for receiving information to invoke the transition from the first operating system to the second operating during a boot-up process or during operation of the first operating system.

In a twenty-ninth example and in furtherance of any of the previous examples, an apparatus may include means for enabling a user selection in a graphical user interface of the first operating system to invoke the transition from the first operating system to the second operating system.

In a thirtieth example and in furtherance of any of the previous examples, an apparatus may include means for saving a system context for the first operating system in another location of the non-volatile memory, the other location associated with the first operating system.

In a thirty-first example and in furtherance of any of the previous examples, an apparatus may include means for receiving information to invoke a transition from the second operating system to the first operating system, means for copying the system context for the first operating system from the other location of the non-volatile memory to the volatile memory, and means for transitioning from the second operating system to the first operating system using the system context for the first operating system.

In a thirty-second example and in furtherance of any of the previous examples, an apparatus may include means for saving a new system context for the second operating system in the location of the non-volatile memory.

In a thirty-third example and in furtherance of any of the previous examples, an apparatus may include means for putting the second operating system into a sleep state comprising a cessation of processes running for the second operating system.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor; and
   a non-transitory computer readable medium to store a set of instructions for execution by the processor, the set of instructions to cause the processor to:
   receive information to invoke a switch from a first operating system to a second operating system, wherein the received information to invoke a switch comprises a request from a peripheral device to switch from the first operating system to the second operating system, wherein the first operating system and the second operating system run on a single computing device, and wherein the received information to invoke a switch comprises a request to switch from the first operating system to the second operating system;
   transition the first operating system from a normal state to a standby state;
   copy a standby context for the first operating system from volatile memory to non-volatile memory while remaining in the standby state, wherein the volatile memory and the non-volatile memory are both on the single computing device;
   receive a request to switch from the second operating system to the first operating system;
   copy the standby context for the first operating system from the non-volatile memory to the volatile memory; and
   transition the first operating system from the standby state to the normal state using the standby context.

2. The apparatus of claim 1, wherein the standby context includes one or more configuration settings for the first operating system, the one or more configuration settings including a register setting, an application setting, a file setting, or an operating system state setting.

3. The apparatus of claim 1, wherein the normal state comprises running of processes for the first operating system.

4. The apparatus of claim 1, wherein the standby state comprises a cessation of processes running for the first operating system.

5. The apparatus of claim 1, wherein the volatile memory comprises dynamic random access memory (DRAM).

6. The apparatus of claim 1, wherein the non-volatile memory comprises a hard disk drive or a flash memory.

7. The apparatus of claim 1, wherein the set of instructions further comprise instructions to cause the processor to receive the information to switch from the second operating system to the first operating system during operation of the second operating system.

8. The apparatus of claim 1, wherein the received information to invoke a switch indicates that a trigger event has occurred at a peripheral device to switch from the first operating system to the second operating system.

9. The apparatus of claim 1, wherein the set of instructions further cause the processor to:
   receive information to invoke a switch from the first operating system to a third operating system;
   transition the first operating system from a normal state to a standby state;
   copy a second standby context for the first operating system from volatile memory to non-volatile memory;
   receive a request to switch from the third operating system to the first operating system;
   copy the second standby context for the first operating system from the non-volatile memory to the volatile memory; and
   transition the first operating system from the standby state to the normal state using the second standby context.

10. A method, comprising:
    receiving information to invoke a switch from a first operating system to a second operating system, wherein the received information to invoke a switch comprises a request from a peripheral device to switch from the first operating system to the second operating system, wherein the first operating system and the second operating system run on a single computing device, and wherein the received information to invoke a switch comprises a request to switch from the first operating system to the second operating system;

transitioning the first operating system from a normal state to a standby state;

copying a standby context for the first operating system from volatile memory to non-volatile memory while remaining in the standby state, wherein the volatile memory and the non-volatile memory are both on the single computing device;

receiving a request to switch from the second operating system to the first operating system;

copying the standby context for the first operating system from the non-volatile memory to the volatile memory; and transitioning the first operating system from the standby state to the normal state using the standby context.

11. The method of claim 10, wherein the standby context includes one or more configuration settings for the first operating system, the one or more configuration settings including a register setting, an application setting, a file setting, or an operating system state setting.

12. The method of claim 10, wherein the normal state comprises running of processes for the first operating system.

13. The method of claim 10, wherein the standby state comprises a cessation of processes running for the first operating system.

14. The method of claim 10, comprising receiving the information to switch from the second operating system to the first operating system during operation of the second operating system.

15. The method of claim 10, wherein the received information indicates a trigger event has occurred at a peripheral device to switch from the first operating system to the second operating system.

16. At least one non-transitory computer-readable storage medium comprising instructions that, when executed, cause a system to:

receive information to invoke a switch from a first operating system to a second operating system, wherein the received information to invoke a switch comprises a request from a peripheral device to switch from the first operating system to the second operating system, wherein the first operating system and the second operating system run on a single computing device, and wherein the received information to invoke a switch comprises a request to switch from the first operating system to the second operating system;

transition the first operating system from a normal state to a standby state;

copy a standby context for the first operating system from volatile memory to non-volatile memory while remaining in the standby state, wherein the volatile memory and the non-volatile memory are both on the single computing device;

receive a request to switch from the second operating system to the first operating system;

copy the standby context for the first operating system from the non-volatile memory to the volatile memory; and transition the first operating system from the standby state to the normal state using the standby context.

17. The computer-readable storage medium of claim 16, wherein the standby context includes one or more configuration settings for the first operating system, the one or more configuration settings to include a register setting, an application setting, a file setting, or an operating system state setting.

18. The computer-readable storage medium of claim 16, wherein the normal state comprises running of processes for the first operating system.

19. The computer-readable storage medium of claim 16, wherein the standby state comprises a cessation of processes running for the first operating system.

20. The computer-readable storage medium of claim 16, comprising instructions that when executed cause the system to receive the information to switch from the second operating system to the first operating system during operation of the second operating system.

21. The computer-readable storage medium of claim 16, wherein the received information indicates a trigger event has occurred at a peripheral device to switch from the first operating system to the second operating system.

* * * * *